(12) United States Patent
Boduch et al.

(10) Patent No.: US 7,787,775 B2
(45) Date of Patent: Aug. 31, 2010

(54) METHODS AND APPARATUS FOR OPTICAL NETWORKS

(75) Inventors: Mark E. Boduch, Geneva, IL (US); Kimon Papakos, Chicago, IL (US); Gary M. Eslary, Lemont, IL (US); John M. Golding, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 844 days.

(21) Appl. No.: 11/531,442

(22) Filed: Sep. 13, 2006

(65) Prior Publication Data
US 2007/0258721 A1 Nov. 8, 2007

Related U.S. Application Data

(60) Provisional application No. 60/798,526, filed on May 8, 2006.

(51) Int. Cl.
    H04B 10/12 (2006.01)
(52) U.S. Cl. .................. 398/147; 398/158; 398/192
(58) Field of Classification Search .......... 398/81, 398/136, 147, 192, 158–159, 167
    See application file for complete search history.

(56) References Cited

U.S. PATENT DOCUMENTS

| | | | |
|---|---|---|---|
| 4,752,125 A * | 6/1988 | Schicketanz et al. | 356/73.1 |
| 5,870,183 A | 2/1999 | Povlsen | |
| 2002/0186437 A1 * | 12/2002 | Sasaoka | 359/161 |
| 2003/0071985 A1 * | 4/2003 | Mori et al. | 356/73.1 |
| 2005/0285058 A1 * | 12/2005 | Beller | 250/559.38 |
| 2006/0110165 A1 | 5/2006 | Seguineau et al. | 398/147 |
| 2006/0127099 A1 | 6/2006 | Eiselt et al. | 398/148 |
| 2006/0133815 A1 | 6/2006 | Fukashiro et al. | 398/147 |
| 2006/0153576 A1 | 7/2006 | Bessios | 398/158 |
| 2007/0248020 A1 * | 10/2007 | Hoque et al. | 370/249 |

FOREIGN PATENT DOCUMENTS

| | | |
|---|---|---|
| EP | 0917311 | 5/1999 |
| WO | WO 2006/116768 | 11/2006 |

OTHER PUBLICATIONS

EPO Search Report and Written Opinion from corresponding EPO application, published Aug. 20, 2007.

* cited by examiner

*Primary Examiner*—Dzung D Tran
(74) *Attorney, Agent, or Firm*—Husch Blackwell Sanders Welsh & Katz

(57) ABSTRACT

A chromatic dispersion compensation system for an optical transmission system incorporates circuitry which determines the length of an optical fiber extending between an output amplifier and an input amplifier. Based on fiber type, the total chromatic dispersion on the fiber is determined. Compensation can then be automatically implemented.

10 Claims, 10 Drawing Sheets

| Fig. 5a | Fig. 5b |

Fig. 7

Transport Overhead (9 columns)

| | | | | | | | | |
|---|---|---|---|---|---|---|---|---|
| A1 | A1 | A1 | A2 | A2 | A2 | J0 | Z0 | Z0 |
| B1 | ⊠ | ⊠ | E1 | ⊠ | ⊠ | F1 | ⊠ | ⊠ |
| D1 | ⊠ | ⊠ | D2 | ⊠ | ⊠ | D3 | ⊠ | ⊠ |
| H1 | H1* | H1* | H2 | H2* | H2* | H3 | H3 | H3 |
| B2 | B2 | B2 | K1 | ⊠ | ⊠ | K2 | ⊠ | ⊠ |
| D4 | ⊠ | ⊠ | D5 | ⊠ | ⊠ | D6 | ⊠ | ⊠ |
| D7 | ⊠ | ⊠ | D8 | ⊠ | ⊠ | D9 | ⊠ | ⊠ |
| D10 | ⊠ | ⊠ | D11 | ⊠ | ⊠ | D12 | ⊠ | ⊠ |
| S1 | Z1 | Z1 | Z2 | Z2 | M1 | E2 | ⊠ | ⊠ |

Section Overhead: rows 1-3
Line Overhead: rows 4-9

⊠ : Undefined Overhead byte (All-zeros pattern as an objective)
\* : Concafenation Indication
  H1* = 1001XX11
  H2* = 11111111

Fig. 8

Transport Overhead (9 columns)

| | | | | | | | | |
|---|---|---|---|---|---|---|---|---|
| A1 | A1 | A1 | A2 | A2 | A2 | J0 | Z0 | Z0 |
| B1 | CW | MM | E1 | ⊠ | ⊠ | F1 | ⊠ | ⊠ |
| D1 | ⊠ | ⊠ | D2 | ⊠ | ⊠ | D3 | ⊠ | ⊠ |
| H1 | H1* | H1* | H2 | H2* | H2* | H3 | H3 | H3 |
| B2 | B2 | B2 | K1 | ⊠ | ⊠ | K2 | ⊠ | ⊠ |
| D4 | ⊠ | ⊠ | D5 | ⊠ | ⊠ | D6 | ⊠ | ⊠ |
| D7 | ⊠ | ⊠ | D8 | ⊠ | ⊠ | D9 | ⊠ | ⊠ |
| D10 | ⊠ | ⊠ | D11 | ⊠ | ⊠ | D12 | ⊠ | ⊠ |
| S1 | Z1 | Z1 | Z2 | Z2 | M1 | E2 | ⊠ | ⊠ |

Section Overhead: rows 1-3
Line Overhead: rows 4-9

⊠ : Undefined Overhead byte (All-zeros pattern as an objective)
\* : Concafenation Indication
  H1* = 1001XX11
  H2* = 11111111

Fig. 10

Internal Processed OSC Transmit Signal (Network Element 1), After Inserting Measurement Marker

| B1 | 55h | 99h | E1 | 00h | 00h | F1 |

↑ Measurement Marker Location

External Processed OSC Transmit Signal (Network Element 1), After Inserting Measurement Marker

| B1 | 55h | 99h | E1 | 00h | 00h | F1 |

↑ Measurement Marker Location $t_{ID1}$ Internal Delay 1

External Processed OSC Receive Signal (Network Element 2), After Inserting Measurement Marker

| B1 | 55h | 99h | E1 | 00h | 00h | F1 | 00h | 00h |

↑ Measurement Marker Location $t_{PD}$ (One Way Propagation Delay)

External Processed OSC Transmit Signal (Network Element 2), After Receiving Measurement Marker

| B1 | AAh | 99h | E1 | 00h | 00h | F1 | 00h | 00h |

↑ Measurement Marker Location $t_{ID2}$ Internal Delay 2

External Processed OSC Receive Signal (Network Element 1), After Receiving Measurement Marker

| B1 | AAh | 99h | E1 | 00h | 00h | F1 | 00h | 00h |

↑ Measurement Marker Location $t_{PD}$ (One Way Propagation Delay)

Internal Processed OSC Receive Signal (Network Element 1), After Receiving Measurement Marker

| B1 | AAh | 99h | E1 | 00h | 00h | F1 | 00h | 00h |

↑ Measurement Marker Location $t_{ID3}$ Internal Delay 3

$t_{PD} + t_{PD} + t_{ID1} + t_{ID2} + t_{ID3}$
(Two Way Propagation Delay + Internal Delays)

Measured delay ($t_{MD}$) = $t_{PD} + t_{PD} + t_{ID1} + t_{ID2} + t_{ID3}$

Round trip delay ($t_{RTD}$) = $t_{MD} - t_{ID1} - t_{ID2} - t_{ID3}$

One way propagation delay ($t_{PD}$) = $\dfrac{t_{RTD}}{2}$

METHODS AND APPARATUS FOR OPTICAL NETWORKS

CROSS-REFERENCE TO RELATED APPLICATION

This application claims the benefit of the filing date of U.S. Provisional Application Ser. No. 60/798,526 filed May 8, 2006 and entitled "Methods and Apparatus for Optical Networks". The '526 application is incorporated herein by reference.

FIELD

This invention relates in general to the field of optical networks. Various aspects of the present invention find application in the field of optical networks including, by way of example, networks that make use of wavelength division multiplexing technologies.

BACKGROUND

Wavelength Division Multiplexing (WDM), including without limitation Dense Wavelength Division Multiplexing (DWDM), are techniques that enable a multitude of optical wavelengths of differing frequencies to be transported over a single optical fiber. A DWDM network, for example, is constructed by interconnecting multiple DWDM network elements using glass optical fiber.

One limitation of maximum transmission distance over an optical fiber is chromatic dispersion, or spreading of optical pulses as they travel along the fiber. For single-mode optical fiber, chromatic dispersion occurs because the index of the glass varies slightly depending on the wavelength of the light, and the light associated with optical transmitters have non-zero spectral width. In order to combat the effects of chromatic dispersion, chromatic dispersion compensation devices and methods have been developed.

In known DWDM systems, chromatic dispersion compensation is often performed on each input fiber of each network element. Chromatic dispersion compensation can be carried out by using dispersion compensation fibers (DCF) or optical tunable dispersion compensators (OTDC). There continues to be a need for more cost effective solutions to the problem of chromatic dispersion in optical transmission systems. Preferably such compensation could be achieved by incorporating standardized compensation modules into optical network elements irrespective of length of the associated optical fiber. Further, it would be desirable if compensation processing could be carried out in real-time without any interruption of the flow of traffic in the respective optical fiber.

SUMMARY OF THE INVENTION

In accordance with the invention, chromatic dispersion of an optical fiber can be automatically compensated. Length establishing circuitry can automatically establish a length parameter of a respective optical fiber. Determination circuitry, responsive to the established length parameter can automatically determine chromatic dispersion of the fiber.

BRIEF DESCRIPTION OF DRAWINGS

FIG. 7 is a diagram from a Telcordia document GR-253-CORE illustrating exemplary transport overhead assignment for an OC-3 signal carrying an STS-3c Synchronous Payload Envelope (SPE);

FIG. 8 is a diagram as in FIG. 7, illustrating use of two normally unused bytes in the overhead to carry proprietary information according to one embodiment of the present invention;

FIG. 10 is a timing diagram depicting the measurement delays according to one exemplary embodiment of the present invention.

DETAILED DESCRIPTION

Figure 1:
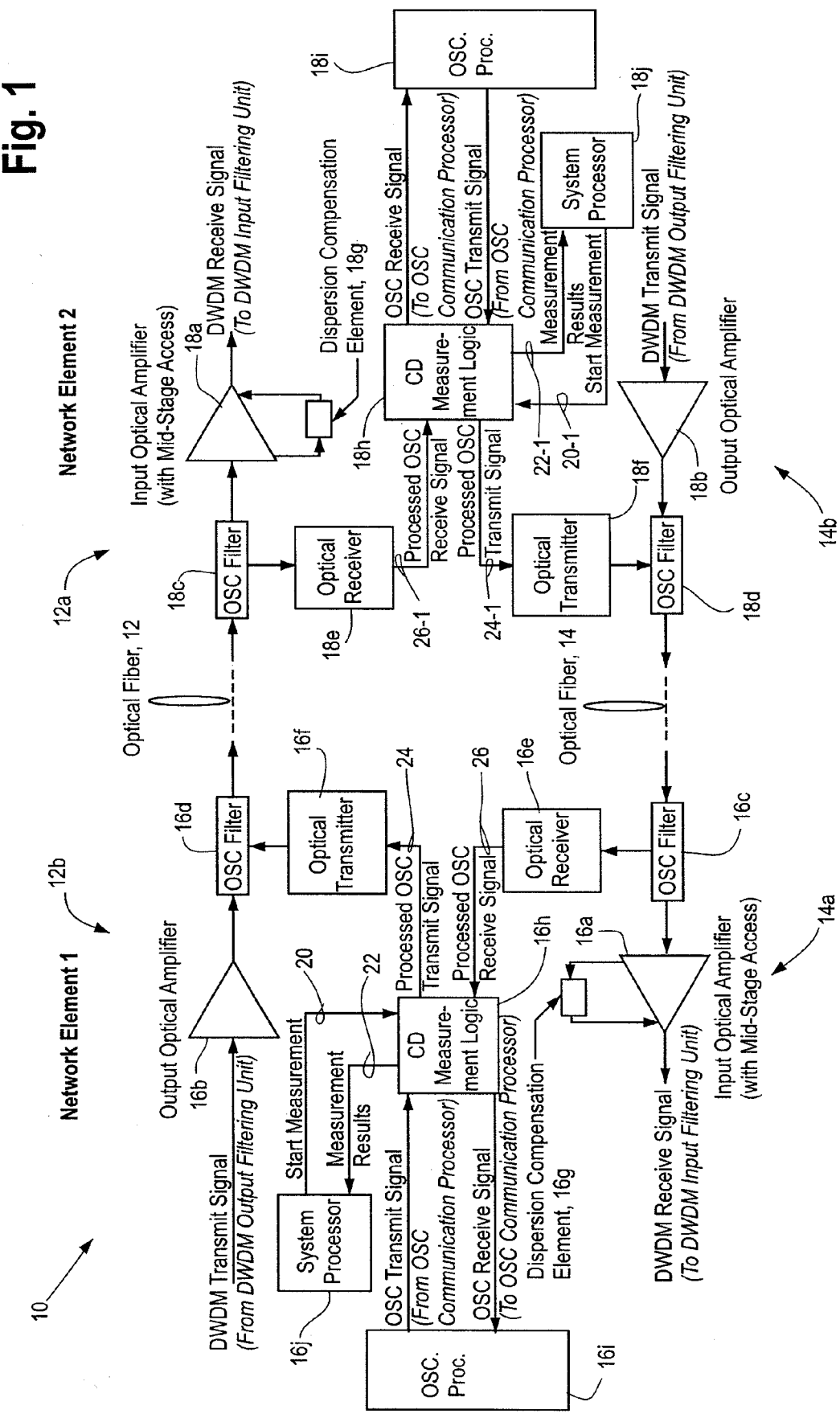
FIG. 1 is a diagram of two fiber links and associated Network Elements according to one exemplary embodiment of the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Methods and apparatus which embody the present invention provide improved techniques for chromatic dispersion identification and/or compensation. Since the amount of chromatic dispersion associated with any given fiber depends upon the length of fiber and the type of fiber, an appropriate amount of compensation can be applied to the fiber once the length and type of fiber is determined.

In accordance with a disclosed embodiment of the invention, a value that either directly or indirectly corresponds to the length of the fiber at issue can be used to determine the amount of chromatic dispersion of the fiber and/or the appropriate amount of dispersion compensation for the fiber. Preferably, this value is derived directly from a measured length of the fiber, and is used in conjunction with information related to the type of fiber at issue to make the chromatic dispersion determination.

Methods and apparatus which embody the present invention can automatically derive one or more values that correspond to fiber length in real-time during normal operation. The amount of chromatic dispersion of an optical fiber and/or the appropriate amount of dispersion compensation for that fiber can then be efficiently and effectively determined concurrently with normal traffic transmission.

In one aspect of the invention, fiber length measurements can be made without interrupting the flow of traffic over the fiber being measured. Moreover, fiber measurements can be initiated immediately upon installation of DWDM network transmission elements, or any time thereafter. Preferably, measurement modules will be incorporated into DWDM network elements.

FIG. 1 is a block diagram illustrating an exemplary embodiment 10 of the present invention. Two optical fibers 12, 14 are coupled by associated interface circuitry 12a, b, 14a, b between two connected Network Elements 1, 2. Each Network Element, such as Network Element 1 includes both an input and output amplifier 16a, b, two optical supervisory channel (OSC) filters 16 c, d, an OSC optical receiver 16e, an OSC optical transmitter 16f, a dispersion compensation element 16g, CD measurement logic 16h, input and output DWDM filtering units (not shown), an OSC communication processor 16i and a system processor 16j both of which are of a type that would be known to those of skill in the art. Network Element 2 includes corresponding elements 18a-18j as would be understood by those of skill in the art.

In one embodiment of the present invention, the CD Measurement logic 16h, 18h of FIG. 1 performs a Chromatic Dispersion measurement. The measurement may be initiated at Network Element 1 or at Network Element 2.

The measurement can be initiated at Network Element 1 by activating a "Start Measurement" signal 20, from processor 16j within Network Element 1. Once the measurement that is initiated at Network Element 1 is complete, the measurement results are available to processor 16j via a signal 22 labeled "Measurement Results" within Network Element 1. In a similar manner, the Chromatic Dispersion measurement may be initiated at Network Element 2 via a corresponding signal 20-1.

The OSC filter, for example 16d, 18d at the output of each output amplifier 16b, 18b is used to combine the transport information carrying DWDM signal with an optical supervisory signal such as 24, 24-1. An OSC filter, such as 16c, 18c at the input of each input amplifier 16a, 18a is used to separate the optical supervisory channel from the transport carrying DWDM signal.

The optical supervisory signal is normally used to carry network level control information from one network element to another. In a non-measurement mode of operation, the CD measurement logic 16h, 18h couples the OSC Transmit signal input to the Processed OSC Transmit signal output 24, 24-1 (without modification), and couples the Processed OSC Receive signal input signal 26, 26-1 to the OSC Receive signal output (without modification).

Figure 2:
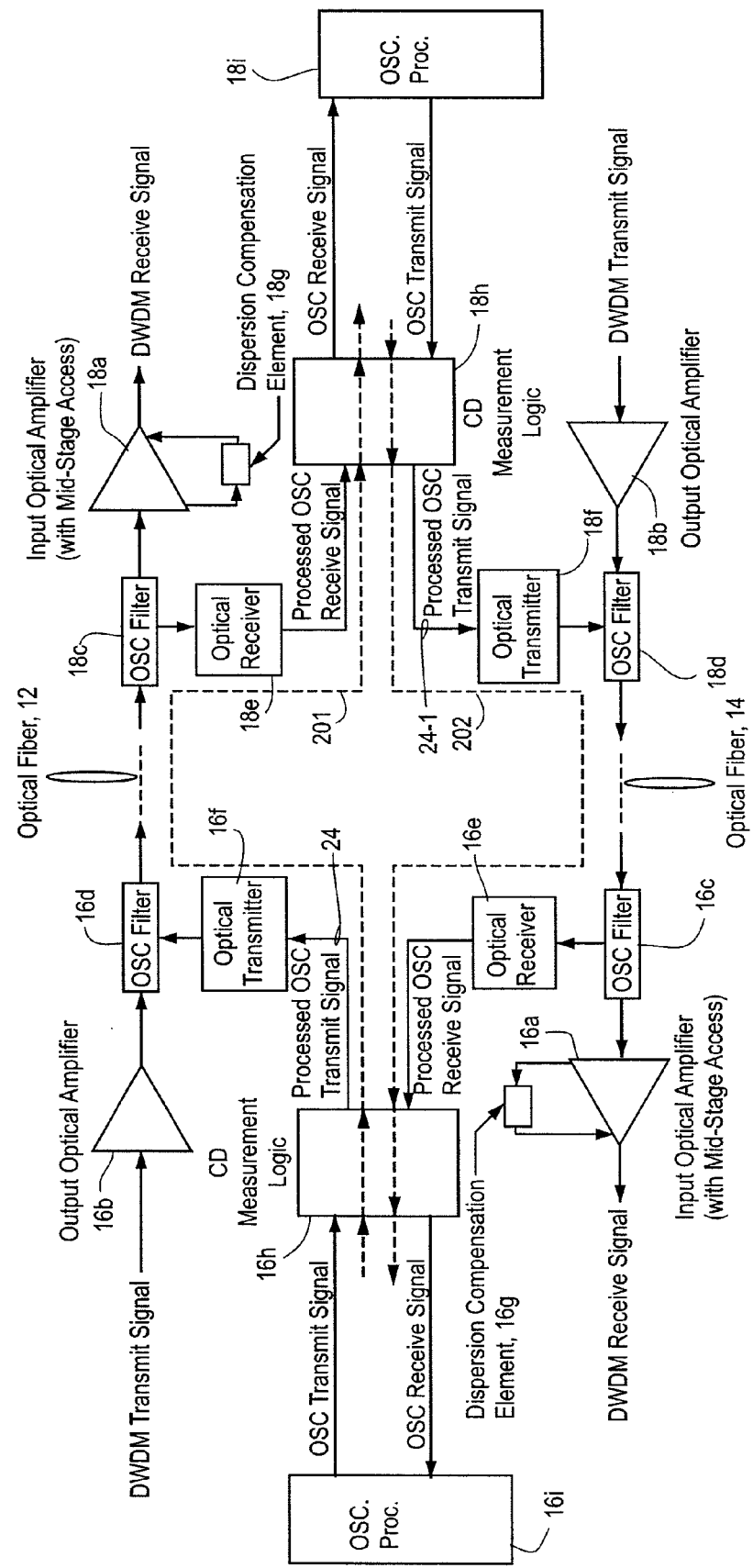
FIG. 2 is a diagram of a non-measurement mode of operation according to one exemplary embodiment of the present invention.

A non-measurement mode of operation is illustrated in FIG. 2. In FIG. 2, the OSC signal path from Network Element 1 to Network Element 2 is illustrated via a dotted line indicated by 201. In FIG. 2, the OSC signal path from Network Element 2 to Network Element 1 is illustrated via a dotted line indicated by 202.

Figure 3:
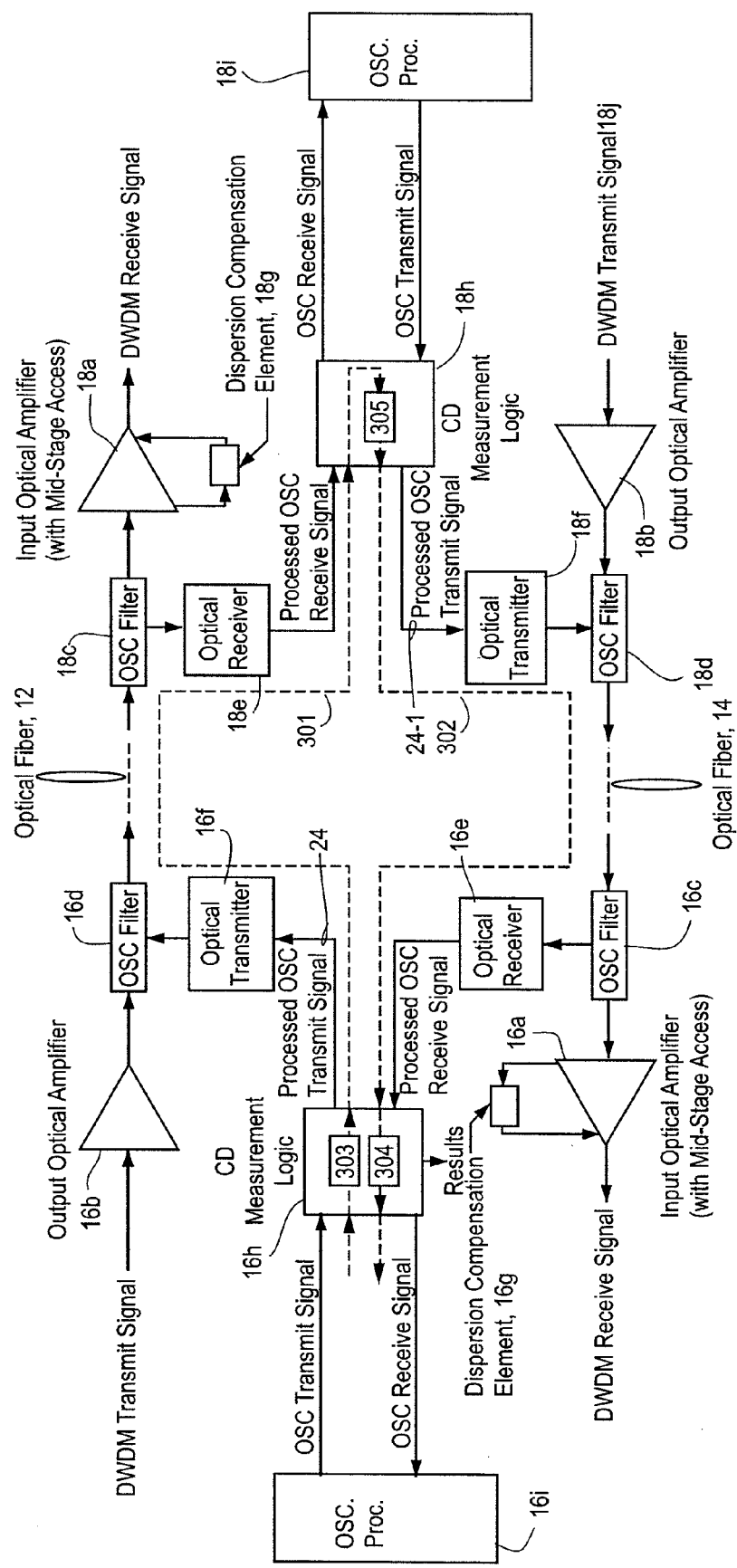
FIG. 3 is a diagram of a measurement mode of operation according to one exemplary embodiment of the present invention.

FIG. 3 illustrates the measurement operation for the case where a measurement is initiated at Network Element 1. For this case, the OSC Transmit signal in Network Element 1 is modified such that a "far-end loop back" code word is inserted into the OSC Transmit signal via circuitry or logic 303, and the resulting signal (Processed OSC Transmit signal), signal 24, is forwarded to Network Element 2 via path 301. When the "far-end loop back" code is received by circuitry 305 at Network Element 2, Network Element 2 loops back the Processed OSC Receive signal to the Processed OSC Transmit signal, as shown in FIG. 3 via signal 24-1 and path 302.

In addition to performing the loop back operation, Network Element 2 also inserts a "loop back performed" indicator into the Processed OSC Transmit signal via circuitry 305. After Network Element 1 determines that the loop back has been performed, it performs a measurement of the time it takes for a signal to propagate from Network Element 1 to Network Element 2 and back to Network Element 1 (i.e., the round trip propagation delay).

Figure 4:
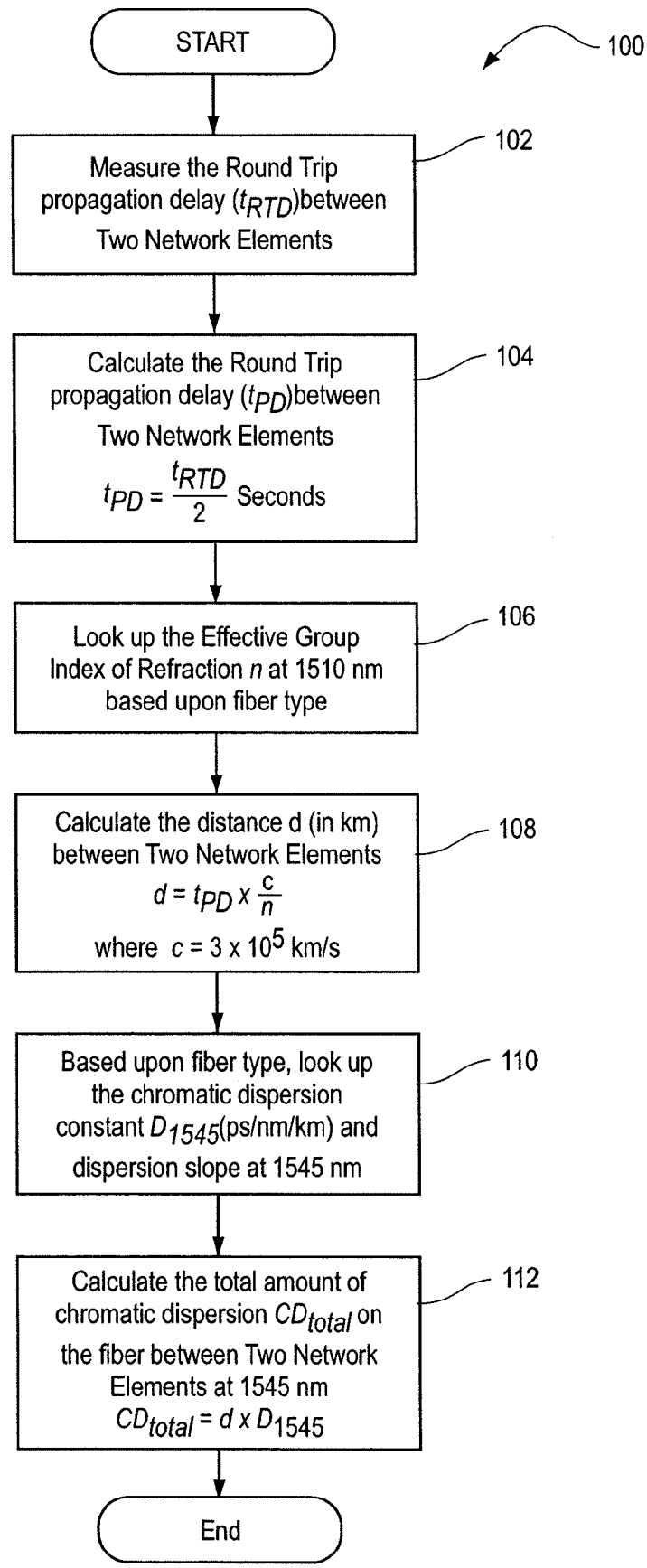
FIG. 4 is the flow diagram illustrating determining the total chromatic dispersion on a fiber between two Network Elements according to one exemplary embodiment of the present invention.

Once the time measurement is complete, the total Chromatic Dispersion of the fibers between Network Element 1 and Network Element 2 can be determined using the processing illustrated in flow diagram 100 of FIG. 4.

Two tables are incorporated in the flow diagram 100 of FIG. 4. One table stores the effective group index of refraction of various fiber types at 1510 nm (the wavelength of the OSC Channel). The other table stores the chromatic dispersion constants and dispersion slopes of various fiber types at 1545 nm (assuming C-Band operation).

In one embodiment of the present invention, the "CD Measurement Logic" blocks 16h, 18h of FIG. 1 implement the processing of the flow chart 100 of FIG. 4. In another embodiment of the present invention, only the round trip delay measurement is performed by the "CD Measurement Logic" blocks shown in FIG. 1, with the remaining steps being performed by a processor external to the "CD Measurement Logic" blocks. For example, processors 16j, 18j could carry out the remaining steps and determine the compensation required (which can be provided by elements 16g, 18g) based on a determination of chromatic dispersion. Other processing variations come within the spirit and scope of the invention. The location of such processing is not a limitation of the invention.

The round trip chromatic dispersion determination, as described herein, assumes that the two fibers between a given set of Network Elements, such as Network Element 1, 2 are substantially the same length. It also assumes that the type of fiber between a given set of Network Elements is known. These assumptions are consistent with the vast majority of applications.

In accordance with a preferred example embodiment of the present invention, the determination of chromatic dispersion represented by the flow chart of FIG. 4, can be used, in turn, to appropriately compensate for the chromatic dispersion. By way of example and illustration, such compensation may be realized through selective tuning of an OTDC, elements 16g, 18g. Such tuning would be based upon the determined amount of chromatic dispersion. Control can be implemented using the circuitry which makes the chromatic dispersion determination (for example processor 16j or 18j without limitation).

With respect to processing 100 of FIG. 4, in Step 102 the round trip propagation delay between two Network Elements is measured. In Step 104 the one way propagation delay between the Network Elements is calculated. In Step 106 the effective group index of refraction n is retrieved from Table 1. In Step 108 the distance d is calculated between the Network Elements. In Step 110 a chromatic dispersion constant, based on fiber type, is obtained from Table 2. Finally, in Step 112 the total amount of chromatic dispersion on the fiber between the two Network Elements is calculated. Compensation can then be automatically carried out.

Those of skill will understand that a variety of measurement processes can be used to determine the length of a respective optical fiber. All such variations come within the spirit and scope of the present invention. For example, transit time in one direction along a fiber can be determined. Chromatic dispersion for that segment of fiber can be automatically determined as disclosed above. The fiber can then be automatically compensated.

Alternately, measurement indicia can be transmitted bi-directionally on the same fiber. A length determination of that singular fiber can then be determined in accordance with the above. Chromatic dispersion can be established for that fiber based on the roundtrip measurement of the singular fiber. That fiber can then be automatically compensated.

Figures 5, 5A:
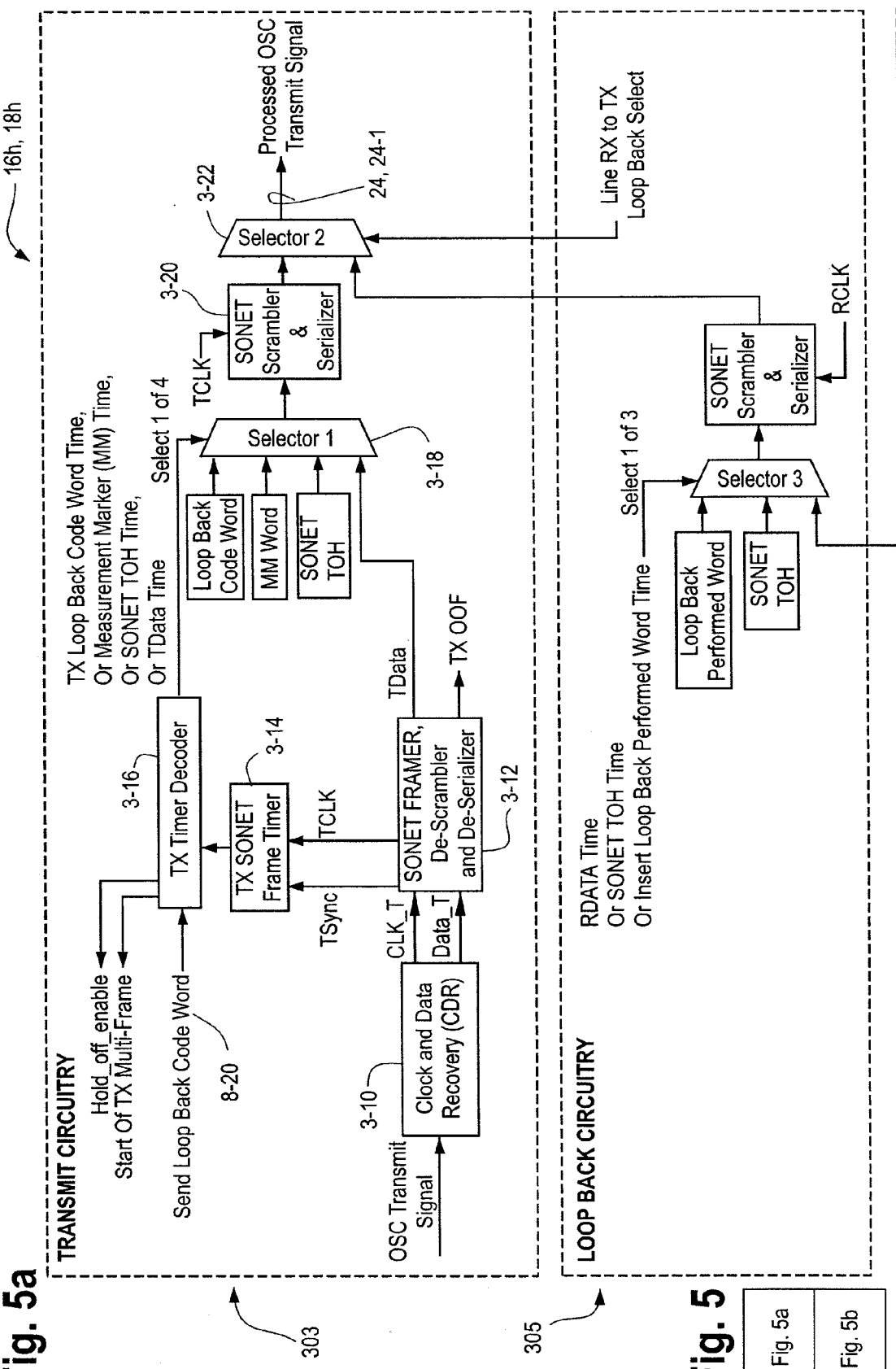
FIG. 5 is a block diagram of the "CD Measurement Logic" blocks according to one embodiment of the present invention.
Figure 5B:
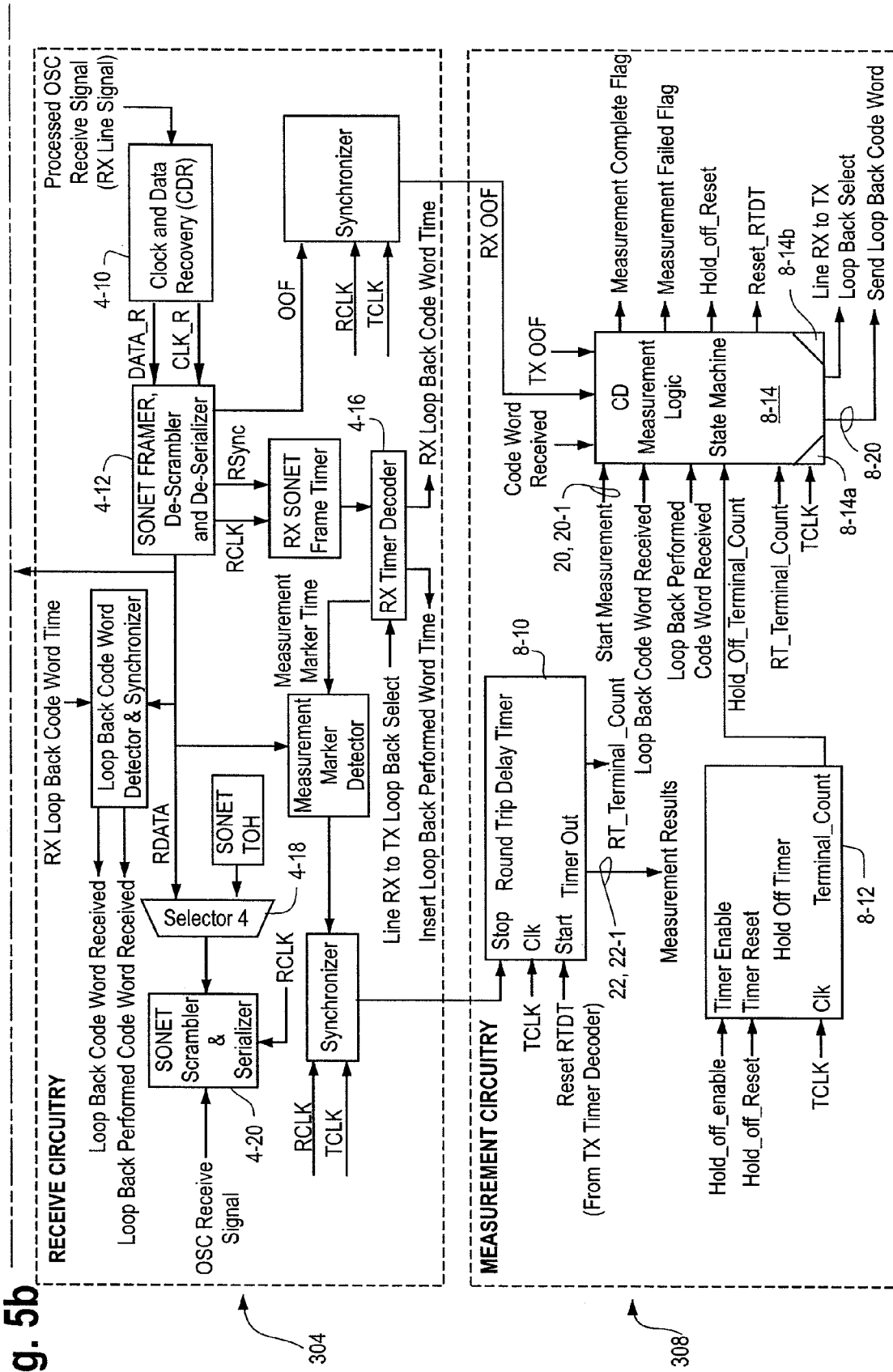

FIG. 5 illustrates one possible implementation of the CD Measurement Logic 16h, 18h of FIGS. 1-3. This implementation assumes the use of a SONET based OSC channel, although other formats come within the spirit and scope of the invention. Those of skill in the art will recognize the purpose and function of various SONET-type signals in FIG. 5. Such signals except to the extent noted subsequently need not be discussed further.

The implementation illustrated in FIG. 5 includes the transmit CD measurement circuitry 303, the receive CD measurement circuitry 304 of the measurement initiator (Network Element 1 in FIG. 3), and the loop back circuitry 305 of the non-initiator (Network Element 2 in FIG. 3). Therefore, if the modular circuitry shown in FIG. 5 is incorporated in the CD Measurement Logic 16h, 18h of both Network Element 1 and 2, then either Network Element 1 or Network Element 2 can initiate a measurement and carry out any needed compensation.

FIG. 5 also illustrates exemplary measurement circuitry 308. Circuitry is present within the CD measurement logic 308 to handle the case where both Network Elements 1 and 2 initiate measurements simultaneously.

Relative to FIG. 5, transmit circuitry 303 includes Clock and Data Recovery element 3-10, SONET Framer 3-12, Frame Timer 3-14, TX timer decoder 3-16, Selector 1 element 3-18, SONET Scrambler and Serializer 3-20 and Selector 2 element 3-22. The output signal from Selector 2, element 3-22 is the processed OSC transmit signal (24, 24-1) which is coupled from measurement circuitry 16h, 18h to a respective optical transmitter 16f, 18f.

The receive circuitry 304 includes Clock and Data Recovery element 4-10, SONET Framer 4-12, RX Timer Decoder 4-16, Selector 4 element 4-18, and SONET Scrambler and Serializer 4-20.

Measurement circuitry 308 includes a Roundtrip Delay Timer 8-10, a Holdoff Timer 8-12 and control circuitry implemented as a finite state machine 8-14. It will be understood that the state machine 8-14 could be implemented with a programmable processor, 8-14a in combination with executable control software 8-14b. Other implementations come within the spirit and scope of the present invention. State machine 8-14 could also be implemented using interconnected hardwired circuit components.

Assuming that Network Element 1 initiates the measurement (as depicted in FIG. 3), Clock and Data Recovery (CDR) element 3-10 is used to first recover clock and data from the composite OSC Transmit Signal entering the CD measurement logic 16h from processor 16i, 18i. The recovered clock and data are then forwarded to the SONET Framer Descrambler and De-Serializer element 3-12. The Framing bytes within the OSC SONET signal are first located. Once these bytes are located, the signal is descrambled and converted to a parallel "word" oriented signal.

The SONET Framer element 3-12 then generates a synchronization signal (TSYNC) which causes the TX SONET Frame Timer 3-14 to synchronize with the incoming SONET data stream. The SONET Frame Timer 3-14 is used to identify when certain word periods are appearing on the SONET data stream (via the TX Timer Decoder 3-16).

The SONET Frame Timer 3-14 is used to clock the Hold Off Timer 8-12 within the Measurement Circuitry 308. The Hold Off Timer 8-12 is clocked once at the end of every SONET frame period (i.e., every 125 micro seconds).

Selector 1 element 3-18 in FIG. 5 is used to insert the normal SONET transport overhead, the normal SONET data (Tdata), a selected loop back code word, or the Measurement Marker (MM) into the Processed OSC Transmit signal output data stream. The SONET Scrambler and Serializer 3-20 scrambles the data according to the SONET scrambling algorithm and then serializes the parallel words received signals from the Selector 1 element 3-18.

Selector 2 element 3-22 is used to either insert the OSC Transmit signal data into the Processed OSC Transmit signal output stream, or to loop back the Processed OSC Receive signal into the Processed OSC Transmit signal output stream. When the respective module 16h, 18h is acting as the measurement initiator, the OSC Transmit signal data is inserted into the Processed OSC Transmit signal output stream, signal 24-1. When the other module 18h or 16h is acting as the measurement non-initiator, the Processed OSC Receive signal is looped back into the Processed OSC Transmit signal output stream as illustrated in FIG. 3 by circuitry 305.

At the start of an initiated measurement, the "Send Loop Back Code Word" signal 8-20 is activated and sent from the CD Measurement state machine 8-14 to the TX Timer Decoder circuitry 3-16. The activation of this signal causes the CD Measurement Logic 16h, 18h to insert the loop back code word into the Processed OSC Transmit Signal output stream at the appropriate time. This code word gets transmitted once per SONET frame period until the measurement is complete.

Once the loop back code word leaves Network Element 1, it propagates along the fiber, such as fiber 12, to Network Element 2. When Network Element 2 receives the loop back code word, it loops back its Processed OSC Receive signal 26-1 to its Processed OSC Transmit signal 24-1 via its Selector 2 element 3-22. It then inserts the "Loop Back Performed" code word into the OSC data stream heading back towards Network Element 1. In one embodiment of the present invention, the "Loop Back Performed" code word is placed into the same word timeslot as the loop back code word. The "Loop Back Performed" code word has a different value than that of the loop back code word.

Once inserted into the Processed OSC Transmit signal at Network Element 2, the "Loop Back Performed" code word propagates along the fiber, such as fiber 14, to Network Element 1. The process of Network Element 2 looping back the SONET signal from Network Element 1 back to Network Element 1 will in nearly all cases cause the SONET Framer 4-12 within the Receive Circuitry 304 of Network Element 1 to go out of frame. Therefore, in order to prevent false measurement readings, a "hold off" period is entered once Network Element 1 starts sending the loop back code word. This time period is greater than twice the maximum round trip fiber delay period plus the time for a SONET framer to go out and back into frame. Network Element 1 uses the Hold Off Timer 8-12 within Measurement Circuitry 308 in order to perform this function.

As previously mentioned, the Hold Off timer 8-12 is clocked once every 125 microseconds. For round trip times on the order of 2 ms (approximately 400 km), plus allowing 1 ms for the framing processes, the Hold Off timer preferably includes a 5 bit counter ($2^5 \times 125$ us=4 ms). Once the Hold Off Timer 8-12 reaches its terminal count, a check is made to determine if the SONET Framer 4-12 within the Receive Circuitry 304 of Network Element 1 is in-frame. If it is in frame, then the CD Measurement Logic 8-14 within Network Element 1 waits for the next loop back code word time slot to occur within the Processed OSC Receive signal data stream. Once this occurs, if the "Loop Back Performed" indicator is not within the loop back code word time slot, the measurement is aborted, and an error flag is set within Network Element 1.

If the "Loop Back Performed" indicator is located within the loop back code word time slot, then Network Element 1 inserts the Measurement Marker word into its Processed OSC Transmit signal at the appropriate time, and starts the Round Trip Delay Timer 8-10 (via the signal Reset RTDT) within its Measurement Circuitry 308.

Once Network Element 1 sends the Measurement Marker, it waits for the return of the Measurement Marker on its Processed OSC Receive signal. Once it receives the looped back Measurement Marker, its Round Trip Delay Timer 8-10 is stopped. The content of the Round Trip Delay Timer 8-10 now represents the amount of time it takes a signal to propagate from Network Element 1 to Network Element 2 and back to Network Element 1.

Once the measurement is complete, Network Element 1 stops sending the loop back code word. This results in Network Element 2 being taken out of its loop back mode. Subsequently, in accordance with the processing, steps 104-112 of FIG. 4, the degree of chromatic dispersion can be determined.

Figure 6:
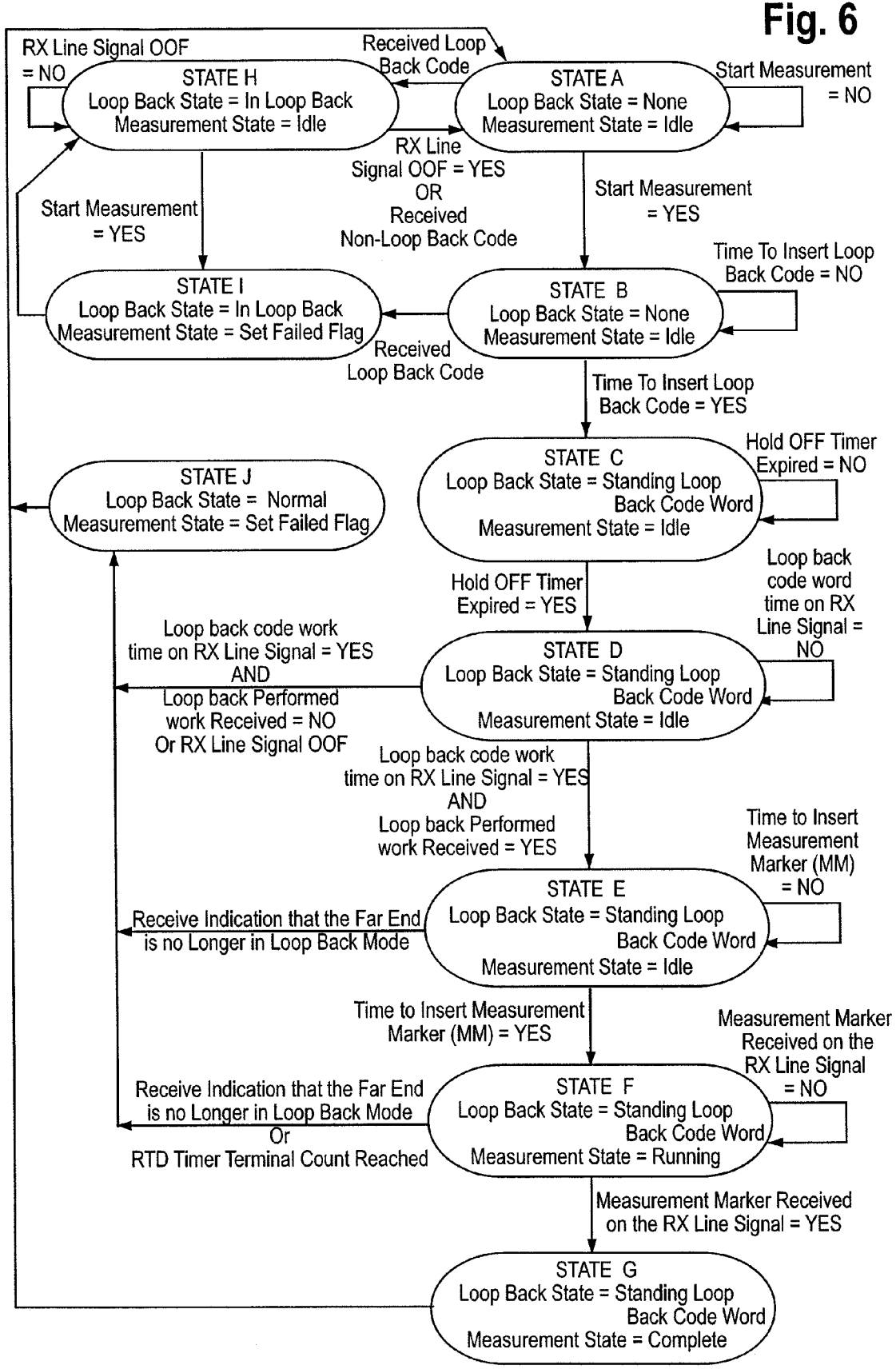
FIG. 6 is a diagram of a state machine within the "CD Measurement Logic" blocks according to one embodiment of the present invention.

Exemplary operation of the CD Measurement Logic State Machine 8-14 is illustrated in FIG. 6. Circuitry 8-14 transitions from initial state A to state B in response to the start measurement signal 20. Circuitry 8-14 transitions from state B to state C at a time to insert the loop back code. (When the loop back code word is inserted, the Hold Off timer is reset.) It transitions from state C to state D when the Hold Off timer 8-12 has timed out. It transitions from state D to state E in response to receiving a loop back code word time indicator and an indication that the loop back performed code word has been received. Alternately, it transitions from state D to state J where the loop back code word time indicator has been received and where the loop back performed code word has not been received.

State machine 8-14 transitions from state E to state F when it is time to insert the measurement marker (MM). (At this time, the Round Trip Timer 8-10 is started via the signal Reset RTDT.) It transitions from state E to state J when the far end is no longer in a loop back mode. It transitions from state F to state G in response to a measurement marker being received on the RX line. It transitions from state F to state J in response to receiving an indication that the far end is no longer in a loop back mode, or, that the Roundtrip Delay Timer 8-10 terminal count has been reached. It transitions from state G to state A once the measurement has been completed.

It transitions from state B to state I in response to having received a loop back code.

It transitions from state A to state H in response to having received a loop back code. (This is the normal path of the non-initiator network element.)

It transitions from state H to state I in response to having received a start measurement signal 20.

In summary, the initiator network element would normally follow the path from A to G to A, and the non-initiator would normally follow the path from A to H to A. If errors occur during the measurement process either state I or state J are entered, and the "measurement failed" flag is set.

Telcordia Technologies develops and markets communications network software. FIG. 7 is a diagram from publicly available Telcordia document GR-253-CORE illustrating exemplary transport overhead assignment for an OC-3 signal carrying an STS-3c Synchronous Payload Envelope (SPE). Such a signal can be used to carry an OSC signal in accordance with the present invention.

FIG. 8 is the same diagram as FIG. 7, except that two unused overhead bytes are used to carry proprietary information bytes according to one embodiment of the present invention. In FIG. 8, the loop back code word (CW) and the Measurement Marker word (MM) are 8-bit words and they are inserted into the two unused overhead bytes after the B1 byte. Other overhead locations or code assignment come within the spirit and scope of the invention.

Figure 9A:
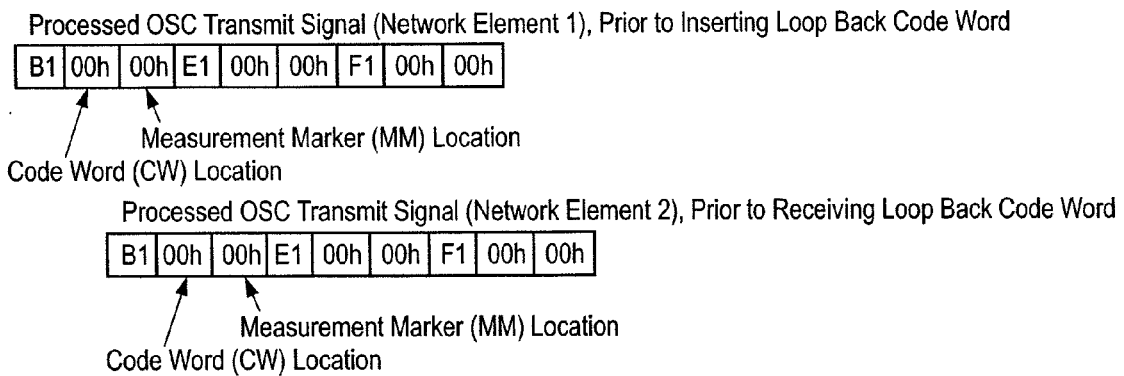
FIG. 9 is a timing diagram depicting the insertion of loop back code words according to one exemplary embodiment of the present invention.
Figure 9B:
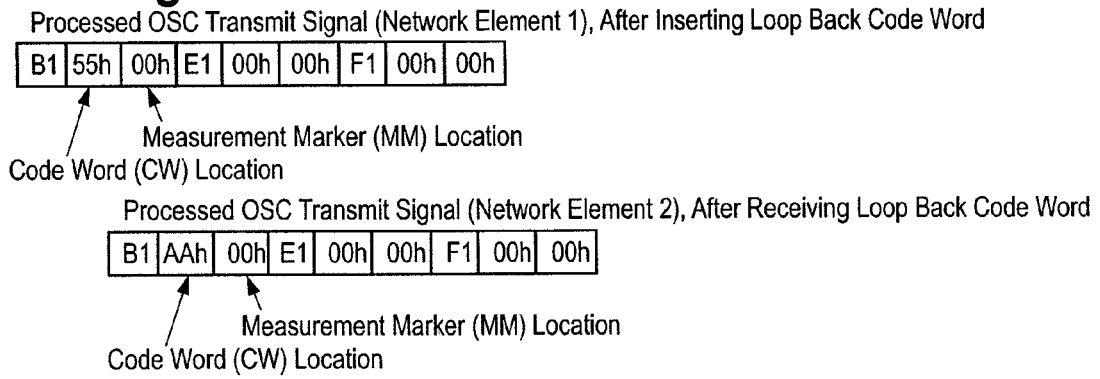
Figure 9C:
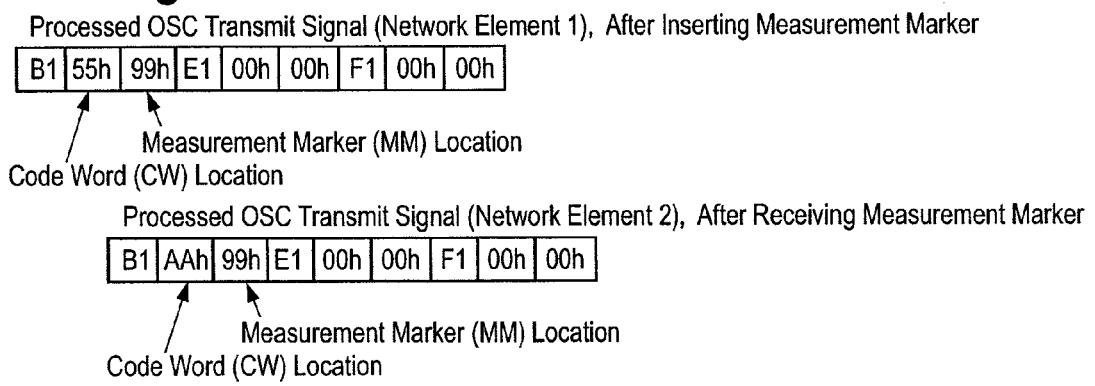

FIG. 9 illustrates a timing diagram depicting the insertion of loop back code words, "Loop Back Performed" words and Measurement Marker words according to one embodiment of the present invention. In this particular embodiment, the loop back code word is 8-bits in length and has the value 55 hexadecimal. The Measurement Marker word is 8-bits in length and has the value 99 hexadecimal. The "Loop Back Performed" word is 8-bits in length and has the value AA hexadecimal.

FIG. 10 illustrates a timing diagram depicting the measurement delays according to one embodiment of the present invention. In FIG. 10, the actual time measured by the round trip delay timer is equal to the propagation delay associated with the fibers in each direction plus internal logic delays. Since the internal logic delays are known, the round trip delay ($t_{RTD}$) can be calculated from the measured delay ($t_{MD}$) by subtracting the internal delays from the measured delay.

Embodiments of the present invention to the extent that may be implemented in software may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions.

The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing description, the invention and various aspects thereof are described with reference to example embodiments. The specification and drawings are accordingly to be regarded in an illustrative, rather than restrictive, sense. It will be evident to those skilled in the art that various modifications and changes may be made to the example embodiments disclosed herein without departing from the broader spirit and scope of the present invention.

The invention claimed is:

1. A control system comprising:
   an optical fiber;
   an optical filter on opposing ends of the optical fiber, said optical filter having a first port that couples with the optical fiber, a second port that couples an optical supervisory channel with the optical fiber and a third port that couples a transport channel with the optical fiber and where the optical filter separates the optical supervisory channel from the transport channel;

at least one measurement module coupled to the optical fiber through the optical supervisory channel, the module includes circuitry to determine a transit time between first and second ends of a traffic carrying optical fiber when in a first mode, the module also includes circuitry to loop back a received optical signal when in a second mode and, where the module includes one of a hardware timer or a software timer to accumulate a representation of the transit time; and circuitry responsive to the determined transit time, to determine a degree of chromatic dispersion.

2. A system as in claim 1 which includes a multi-state control element.

3. A system as in claim 1 which includes additional circuitry, responsive to the representation to establish a degree of chromatic dispersion.

4. A system as in claim 3 which includes a dispersion compensation element coupled to the additional circuitry.

5. An apparatus for compensating chromatic dispersion of an optical fiber where the apparatus comprises:

an optical supervisory channel;

a transport channel:

an optical filter on opposing ends of an optical fiber, said optical filter having a first port that couples with the optical fiber, a second port that couples the optical supervisory channel with the optical fiber and a third port that couples the transport channel with the optical fiber and where the optical filter separates the optical supervisory channel from the transport channel;

first and second spaced apart network elements, the elements are each coupled to a traffic carrying optical fiber through the optical supervisory channel;

first and second substantially identical measurement modules with the first module coupled to the first element and the second module coupled to the second element, at least one of the modules includes one of a hardware timer or a software timer to accumulate a representation of a round trip transit time of a Measurement Marker word between the elements, the modules each include control circuitry that receives in input signal to initiate a round trip measurement transmission between the elements while traffic is being carried between elements; and additional circuitry, responsive to contents of the timer, to determine chromatic dispersion of the fiber between the elements.

6. An apparatus as in claim 5 wherein the control circuitry also initiates operation of the timer, and responsive to a received measurement transmission, a receiving module enters a loop back performed indicator thereinto and returns the transmission to a transmitting module which in response thereto terminates operation of timer; and at least one device that compensates chromatic dispersion, coupled to one of the elements.

7. An apparatus as in claim 6 where each module includes circuitry to enter a loop back indicium into the measurement transmission to the other module and where the other module responds thereto and enters the loop back performed indicator into the received transmission.

8. An apparatus as in claim 7 where the chromatic dispersion determining circuitry includes a plurality of pre-stored values of effective group index of refraction.

9. An apparatus as in claim 7 where the chromatic dispersion determining circuitry includes at least one pre-stored chromatic dispersion constant.

10. An apparatus as in claim 7 where in the absence of the loop back indicium, the other module does not return the transmission to the transmitting module.

* * * * *